United States Patent [19]

Richard

[11] Patent Number: 5,061,033
[45] Date of Patent: Oct. 29, 1991

[54] REMOVABLE OPTICAL INTERCONNECT FOR ELECTRONIC MODULES

[75] Inventor: Fred V. Richard, Scottsdale, Ariz.

[73] Assignee: Motorola, Inc., Schaumburg, Ill.

[21] Appl. No.: 620,806

[22] Filed: Dec. 3, 1990

[51] Int. Cl.⁵ .......................... G02B 6/36; G02B 7/26
[52] U.S. Cl. ...................................... 385/92; 439/911
[58] Field of Search ............... 350/96.20, 96.21, 96.17; 439/55, 76, 78, 911

[56] References Cited

U.S. PATENT DOCUMENTS 4,927,372  5/1990  Collier ................................... 439/78

FOREIGN PATENT DOCUMENTS 2100067 12/1982 United Kingdom ................ 439/911
2179208  2/1987 United Kingdom ................ 439/911

Primary Examiner—William L. Sikes
Assistant Examiner—Robert E. Wise
Attorney, Agent, or Firm—Joe E. Barbee

[57] ABSTRACT

A semiconductor die, either an optical emitter or detector, is attached to an end of an optical fiber. Electrical connections on the semiconductor die are electrically coupled to a circuit board of a module. The electrical coupling is maintained by a removable cover that holds the connections on the semiconductor die in contact with the circuit board. The cover, along with the optical fiber and semiconductor die, can be removed from the module and reattached without effecting the optical coupling between the semiconductor die and the optical fiber.

17 Claims, 2 Drawing Sheets

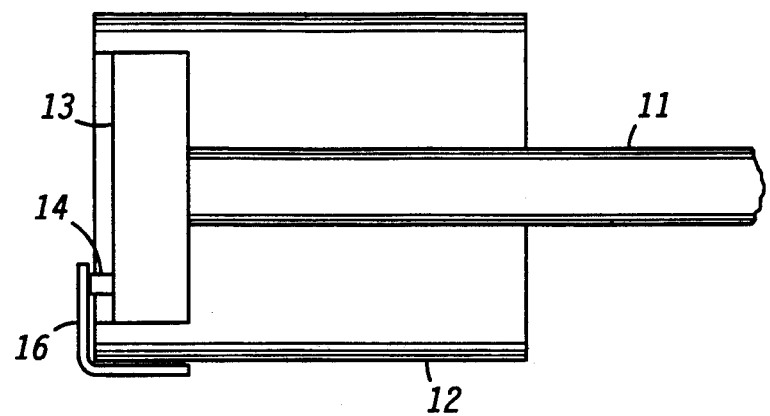
FIG. 1
FIG. 3
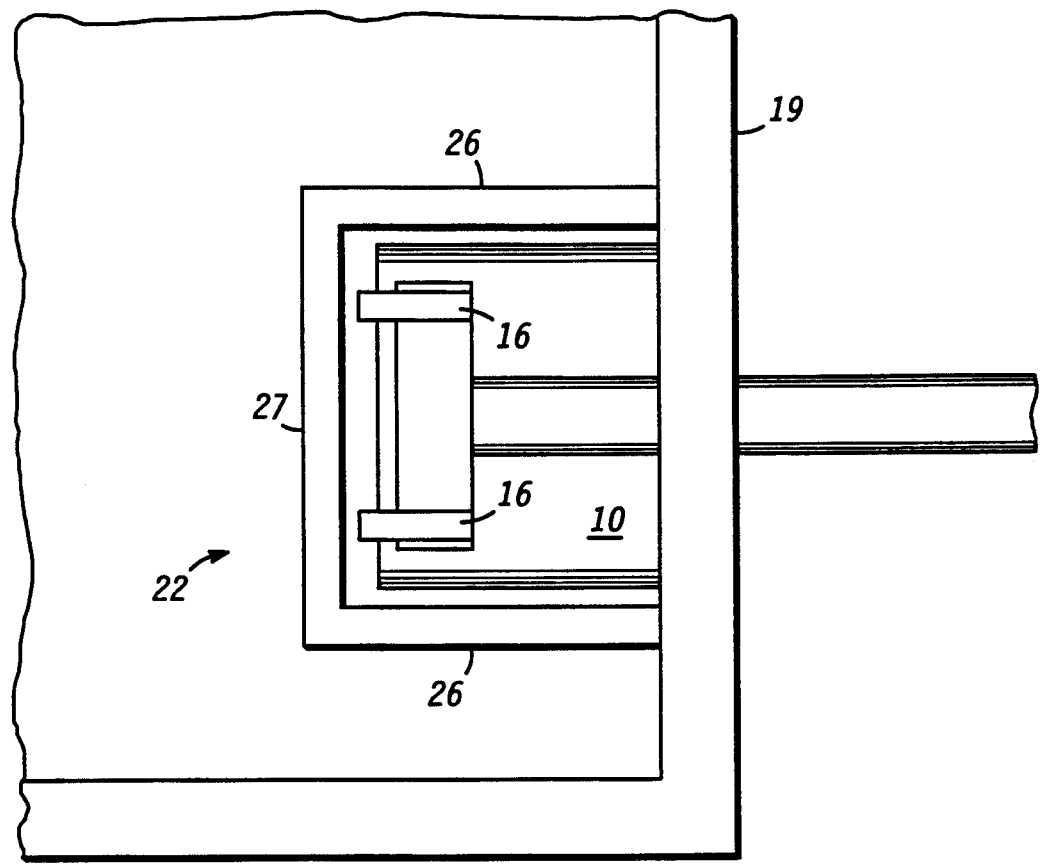

REMOVABLE OPTICAL INTERCONNECT FOR ELECTRONIC MODULES

BACKGROUND OF THE INVENTION

The present invention relates, in general, to optical interconnect of electronic modules, and more particularly, to a novel technique that provides optical interconnect which can be easily separated from the module and accurately reconnected to the module.

Optical fibers had been used in the industry for coupling signals between electronic modules. Since optical fibers accommodated more signals and operated at much higher bandwidth than electrical cables, optical fiber interconnect of electronic modules gained acceptance in the industry. In most cases, the electronic modules included a printed circuit board that had electronics mounted on the board, and a cover to protect the electronics on the board. Generally, semiconductors that emitted or detected optical energy were attached to the board and electrically connected to the electronics on the board. Previous methods for coupling semiconductor emitters or detectors to optical fibers primarily involved one of two techniques. One technique used V shaped grooves etched in a plate as an alignment mechanism. With this technique, an array of emitters was attached to a circuit board. Then an array of optical fibers was attached to the V shaped groove whose periodicity matched that of the emitter array. The alignment plate and attached fibers were then carefully moved around until the fibers aligned with the emitting array. When alignment was achieved, the plate was attached to the board with the grooves in the plate holding the fibers in place. A similar technique was used to align a detector array. Another technique used a package, similar to a 16 pin dual in line semiconductor package, as the alignment structure. An emitter and an imaging lens were mounted in the package, and the lens was aligned to the emitting area of the emitter. An optical fiber was inserted through an opening in the package while guides in the package guided the optical fiber to the lens. A similar technique was used for a detector.

Neither technique provided highly efficient optical coupling that was easily repeatable. Efficient coupling of an emitter to an optical fiber requires alignment tolerances of less than one micron, while efficient coupling of a detector to an optical fiber requires alignment tolerances of approximately one micron. Previous techniques could not repeatedly provide such accurate alignment. Consequently, the coupling of previous alignment techniques was sometimes inefficient. Additionally, the alignment components and the alignment procedures of previous techniques were expensive. For the electronic modules that used the previous optical interconnect methods, removing the cover of the electronic module for maintenance or repair of the electronics, can easily disturb the alignment and reduce the efficiency of the coupling.

Accordingly, it would be desirable to have an optical interconnect for electronic modules that provides high efficiency coupling between an optical fiber and a semiconductor emitter or detector, that provides accurate realignment after the module has undergone maintenance or repair, and that reduces the cost of the optical fiber interconnect.

SUMMARY OF THE INVENTION

Briefly stated, the present invention is achieved by attaching a semiconductor die, either an optical emitter or detector, to an end of an optical fiber. Electrical connections on the semiconductor die are electrically coupled to a circuit board of a module. A removable cover holds the connections on the semiconductor die in contact with the circuit board. The cover, along with the optical fiber and semiconductor die, can be removed from the module and reattached without effecting the optical coupling between the semiconductor die and the optical fiber.

BRIEF DESCRIPTION OF THE DRAWINGS

FIG. 1 is an enlarged cross-sectional view of a semiconductor die attached to an optical fiber in accordance with the present invention;

FIG. 3 is a bottom plan view of the cover for the module of FIG. 2 in accordance with the present invention.

DETAILED DESCRIPTION OF THE DRAWINGS

Figure 2:
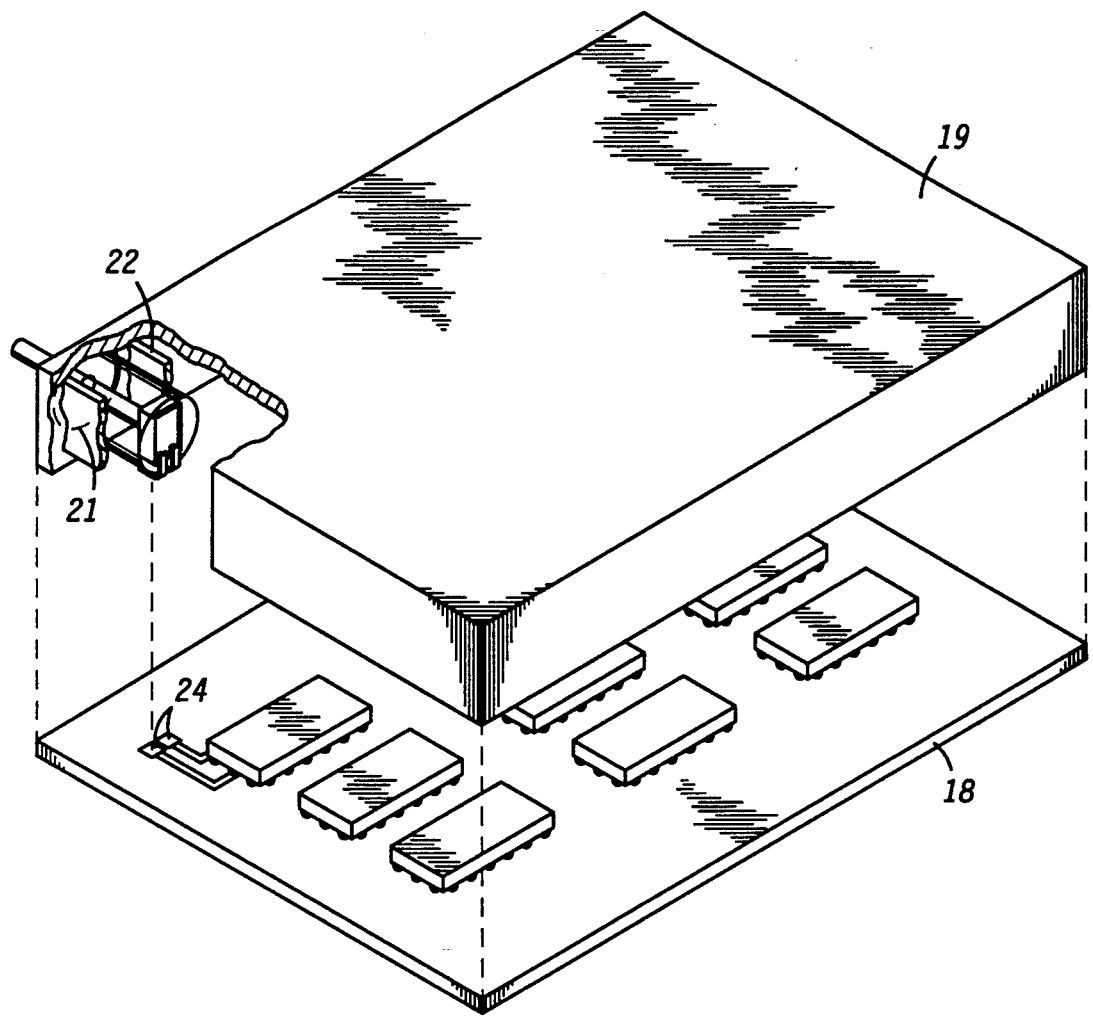
FIG. 2 is an exploded view of an electronic module that has a removable cover, and that uses the optical fiber of FIG. 1 in accordance with the present invention.

Optical interconnect of electronic modules provides for higher data transmission bandwidth than an interconnect using electrical cables, and also permits electrical isolation of modules within a system. Some applications of optical interconnect are for interconnection between subsystems of large computers, interconnection between processing elements within a large parallel processing computer, and interconnection within central office telephone switching systems. For these applications, it is important to be able to remove a module for repair without affecting the efficiency of the optical coupling between the optical fibers, and the emitters or detectors used in the system.

The present invention provides an optical fiber interconnect for electronic modules that has accurate alignment between optical fibers and semiconductor emitters or detectors, and also has accurate realignment after a module has been removed for maintenance, repair, or for other reasons. Stability of the alignment between an optical fiber and a semiconductor die is provided by attaching the semiconductor die to an end of the optical fiber, therefore, alignment is independent of the position of the optical fiber on the module. The optical fiber, along with the associated emitter or detector, is held in place by a removable cover for the module. When attached to the module, the cover presses leads that are attached to the semiconductor die in contact with conducting pads on the module, thereby providing electrical contact between the semiconductor die and the module. In a system, the interconnect technique facilitates removing the module's electronics from the system without disturbing alignment between the optical fiber, and the semiconductor emitter or detector.

While the invention is described with specific preferred embodiments, it is evident that many alternatives and variations will be apparent to those skilled in the art. More specifically, the invention has been described for a particular module structure, although the method is directly applicable to other module structures, as well as to other electrical contact techniques between the module's electronics and the semiconductor die.

Referring to FIG. 1, a fiber assembly 10 has a semiconductor die 13 attached to an optical fiber 11. Leads 16 are attached to die 13 by a means for attachment 14. Generally, the die will have at least two leads 16 and two means for attachment 14, although only one is shown in the cross-sectional view of FIG. 1. Die 13 can be attached to optical fiber 11 by a variety of means.

In the preferred embodiment, optical fiber 11 is inserted into a transparent sleeve 12 containing ultraviolet curing epoxy. Semiconductor die 13 and optical fiber 11 are attached to sleeve 12 by the ultraviolet curing epoxy. One end of sleeve 12 has a recess for inserting die 13 with the recess having a width that is larger than die 13. Alignment of die 13 to optical fiber 11 is accomplished by varying the position of die 13 on the end of optical fiber 11 until maximum coupling is obtained. Then, ultraviolet light is shown through transparent sleeve 12 to cure the epoxy. In addition to providing an attachment mechanism, sleeve 12 is also used to provide mechanical support for optical fiber 11 and semiconductor die 13. Sleeve 12 can be plastic, glass, or other suitable material. After the epoxy has cured, leads 16 are shaped to the form of the end portion of sleeve 12. Sleeve 12 can have a rounded edge to facilitate bending leads 16 without damaging the leads. The portion of leads 16 that are in contact with sleeve 12 forms a means for electrical connection. Subsequently, leads 16 will be pressed against electrical conductors on a module's circuit board in order to provide electrical contact between fiber assembly 10 and the circuit board.

Attaching die 13 to the end of fiber 11, provides the most efficient transfer of optical energy between fiber 11 and die 13. Emitter to fiber tolerances of less than one micron, and detector to fiber tolerances of approximately one micron are easily achieved. Additionally, optical alignment of assembly 10 is insensitive to movement of the assembly.

Generally, an optical fiber will have an emitter attached to one end of the fiber and a detector attached to the other end of the fiber. Die 13 of fiber assembly 10 can be a semiconductor laser, an optical detector, or other suitable optical semiconductor die for emitting or detecting optical energy. Die 13 can also include an integrated driver for the emitter, or an integrated amplifier for the detector. In the preferred embodiment, die 13 is either a surface emitting laser (SEL), a layered P-Intrinsic-N (PIN) diode, or an avalanche photo diode (APD).

FIG. 2 shows a particular configuration of an electronic module that uses fiber assembly 10. An electrical substrate or circuit board 18 is used for mounting and interconnecting semiconductor devices. Circuit board 18 can have various forms such as copper clad fiberglass, multiple layers of copper plated polyimide, a silicon substrate which has a plurality of semiconductor die and interconnect wiring on the substrate's surface, or other forms known to the industry. Semiconductor devices mounted on substrate or circuit board 18 can be assembled in tape automated bonding (TAB) packages, can be flip-chip devices, or have other mounting techniques known to the industry. Circuit board 18 has semiconductor devices mounted and interconnected on the board, and has a means for electrical contact 24 that provides electrical contact to fiber assembly 10. Means for electrical contact 24 can be one of various forms such as; conducting or metallic pads on circuit board 18, conductive elastomers that are attached to circuit board 18, or other suitable means for electrical contact. A removable cover 19, that is attached to circuit board 18 (attachment means not shown), has an opening 21 through which fiber assembly 10 is inserted. Removable cover 19 also has a means for aligning 22 that aligns fiber assembly 10 to insure that leads 16 contact means for electrical contact 24. Means for aligning 22 also applies pressure to fiber assembly 10 in order to maintain good electrical contact between means for electrical contacts 24 and leads 16.

Generally, the module of FIG. 2 is part of a system that may require more than one fiber input or output. Consequently, cover 19 can have several openings 21, fiber assemblies 10, and means for aligning 22, while board 18 would have a number of means for electrical contact 24. For each of these modules, cover 19 can be removed from circuit board 18 without affecting the critical optical alignment of fiber assembly 10. Therefore, circuit board 18 can be repaired or even replaced, and efficient optical interconnect is restored when cover 19 is reattached to circuit board 18.

Referring to FIG. 3, large alignment tolerances between contacts 24 and leads 16 permit various forms to be used as means for aligning 22. Suitable forms maintain alignment between leads 16 of optical assembly 10 and contacts 24 of circuit board 18.

In the preferred embodiment, means for aligning 22 is formed by a three sided rectangle that projects from inside cover 19 and forms a slot that aligns optical assembly 10. Sides 26 guide optical assembly 10, while end 27 provides a stop that controls penetration of optical assembly 10 into cover 19. An adhesive or press fit is used to secure optical assembly 10 within the slot.

Electronics required to operate optical semiconductor die 13, such as drivers for optical emitters and amplifiers for optical detectors, could be mounted in cover 19. Electronics that are mounted in cover 19 couple to means for electrical connection 24 replacing coupling between optical assembly 10 and means for electrical connection 24.

By now it should be appreciated that there has been provided a novel way to fabricate optical interconnect for electronic modules. Attaching a semiconductor die to the end of an optical fiber and utilizing a removable cover to position the fiber assembly on a circuit board provides a simple, low cost technique for providing optical interconnect. Complicated optical alignment mechanisms are eliminated thereby reducing the cost of optical interconnect. Large tolerance electrical contacts are used to couple the optics to the electronics thereby providing coupling that is easily removed and reconnected. The invention has a variety of system applications including use in telephone central office switching systems, communication networks, clock distribution networks within a computer system, interconnection of parallel computer systems, and others.

I claim:

1. A removable optical interconnect for electronic modules which comprises:
   a circuit board having a plurality of semiconductors attached to the circuit board, and having conducting pads on the circuit board for providing electrical contact to the circuit board;
   an optical fiber having an end;
   a semiconductor die having leads for providing electrical contact to the semiconductor die;

a sleeve for attaching the semiconductor die to the optical fiber wherein the sleeve covers a portion of the end of the optical fiber, covers the die on the end of the optical fiber, and extends an amount past the die; and a removable cover on the circuit board, the cover having an opening through which is positioned the end of the optical fiber with the attached semiconductor die, and wherein the cover presses the leads of the semiconductor die in contact with the conducting pads on the circuit board.

2. The optical interconnect of claim 1 wherein the sleeve is glass.

3. The optical interconnect of claim 1 wherein the sleeve is plastic.

4. The optical interconnect of claim 1 including the sleeve attached to both the optical fiber and the semiconductor die by an ultraviolet curing epoxy.

5. The optical interconnect of claim 1 wherein the semiconductor die is an optical device.

6. The optical interconnect of claim 1 wherein the semiconductor die is a surface emitting laser.

7. The optical interconnect of claim 1 further including conductive elastomers on the circuit board wherein the conductive elastomers contact the leads of the semiconductor die and electrically couple the circuit board to the semiconductor die.

8. A method for interconnecting electronic modules which comprises:

providing a substrate having a means for providing electrical contact;

covering the substrate with a removable cover having an opening;

providing an optical fiber;

maintaining contact between an end of the optical fiber and a semiconductor die wherein the semiconductor die has a means for electrical connection;

positioning the semiconductor die and the optical fiber through the opening in the cover; and coupling the means for electrical connection of the semiconductor die to the means for providing electrical contact of the substrate.

9. The method of claim 8 wherein the maintaining contact step includes holding the semiconductor die in contact with the end of the optical fiber by using a sleeve that covers at least a portion of the fiber and a portion of the semiconductor die.

10. The method of claim 9 wherein holding the semiconductor die includes securing the sleeve to both the semiconductor die and the optical fiber by using an ultraviolet curing epoxy.

11. The method of claim 8 wherein the maintaining contact step includes holding an optical semiconductor in contact with the end of the optical fiber.

12. The method of claim 8 wherein the coupling the means for electrical connection of the semiconductor die step further includes coupling the means for electrical connection of the semiconductor die to a conductive elastomer that is electrically connected to the substrate.

13. An optical fiber connection for electronic modules which comprises:

an optical fiber;

a semiconductor die attached to an end of the optical fiber wherein the semiconductor die has a means for electrical connection; and a removable cover for the module wherein the removable cover presses the means for electrical connection of the semiconductor die in contact with electrical contacts on the module thereby electrically coupling the semiconductor die to the module.

14. The optical fiber connection of claim 13 further including the semiconductor die attached to the optical fiber by a sleeve.

15. The optical fiber connection of claim 13 wherein the semiconductor die is an optical device.

16. The optical fiber connection of claim 13 wherein the means for electrical connection of the semiconductor die includes leads attached to the semiconductor die.

17. A removable optical interconnect for electronic modules comprising:

a substrate having a plurality of semiconductor devices and electrical contacts;

a removable cover for covering the substrate and plurality of semiconductor devices;

a semiconductor optical device having electrical leads;

an optical fiber aligned to the semiconductor device and held in alignment by a sleeve means; and an alignment means for holding the semiconductor device in alignment so that the electrical leads and the electrical contacts are in alignment so that when the removable cover is in position on the substrate pressure is exerted by the removable cover to maintain the electrical leads in contact with the electrical contacts.

* * * * *